United States Patent
Staples et al.

(10) Patent No.: US 7,299,531 B2
(45) Date of Patent: Nov. 27, 2007

(54) TELESCOPIC MEASUREMENT DEVICE

(76) Inventors: Bruce L. Staples, 9902 Heritage La., Glen Allen, VA (US) 23060; Patrick F. Smith, 1920 White Lake Dr., Fredericksburg, VA (US) 22407

( * ) Notice: Subject to any disclaimer, the term of this patent is extended or adjusted under 35 U.S.C. 154(b) by 40 days.

(21) Appl. No.: 10/852,419

(22) Filed: May 25, 2004

(65) Prior Publication Data

US 2005/0273992 A1    Dec. 15, 2005

(51) Int. Cl.
 *B23P 11/00* (2006.01)
 *E04B 1/346* (2006.01)
(52) U.S. Cl. .............. 29/434; 29/469; 52/67; 52/79.5; 4/599
(58) Field of Classification Search ........... 29/434, 29/469; 4/599; 52/67, 79.5
See application file for complete search history.

(56) References Cited

U.S. PATENT DOCUMENTS

| | | | | |
|---|---|---|---|---|
| 3,925,828 A * | 12/1975 | Kim | ................ | 4/599 |
| 4,934,396 A * | 6/1990 | Vitta | ................ | 135/139 |
| 5,010,909 A * | 4/1991 | Cleveland | ................ | 135/125 |
| 5,077,842 A * | 1/1992 | Horne, Jr. | ................ | 4/568 |
| 5,469,587 A * | 11/1995 | Demeny | ................ | 4/599 |
| 5,671,900 A * | 9/1997 | Cutler | ................ | 248/451 |
| 5,810,596 A * | 9/1998 | Van Lookeren Campagne | ................ | 434/62 |
| 5,915,810 A | 6/1999 | Cameron | | |
| 5,920,927 A * | 7/1999 | Thomas | ................ | 4/599 |
| 5,937,452 A * | 8/1999 | Brewer | ................ | 4/460 |
| 6,000,175 A * | 12/1999 | Gale et al. | ................ | 52/63 |
| 6,148,450 A * | 11/2000 | Nicholas | ................ | 4/526 |
| 6,324,750 B1 | 12/2001 | Saunders et al. | | |
| 6,374,843 B1 * | 4/2002 | Zou | ................ | 135/145 |
| 6,447,080 B1 | 9/2002 | Rheault et al. | | |
| 6,622,408 B2 * | 9/2003 | Dicke et al. | ................ | 40/610 |
| 6,625,912 B2 * | 9/2003 | Dicke et al. | ................ | 40/610 |
| 6,745,414 B2 * | 6/2004 | Zhou | ................ | 4/599 |
| 6,792,708 B2 * | 9/2004 | Dicke et al. | ................ | 40/610 |

* cited by examiner

*Primary Examiner*—Essama Omgba
(74) *Attorney, Agent, or Firm*—Whitham, Curtis, Christofferson & Cook, PC

(57) ABSTRACT

A telescopically adjustable structure capable of defining or measuring an arbitrary three-dimensional volume and having twelve telescopically adjustable telescopic units, capable of maintaining a change in telescopic length and eight corner connection units for assembling the telescopic rods into a three-dimensional structure. A method of assembly may have the telescopic units adjusted to specified length prior to three-dimensional assembly or, alternately, the telescopic units may be assembled in collapsed telescopic form, and adjusted in assembled fashion. Particularly suited to provide a lightweight, low-cost, low-damage furniture or object double to check how the furniture volume might fit in a space or be transported to a space.

24 Claims, 4 Drawing Sheets

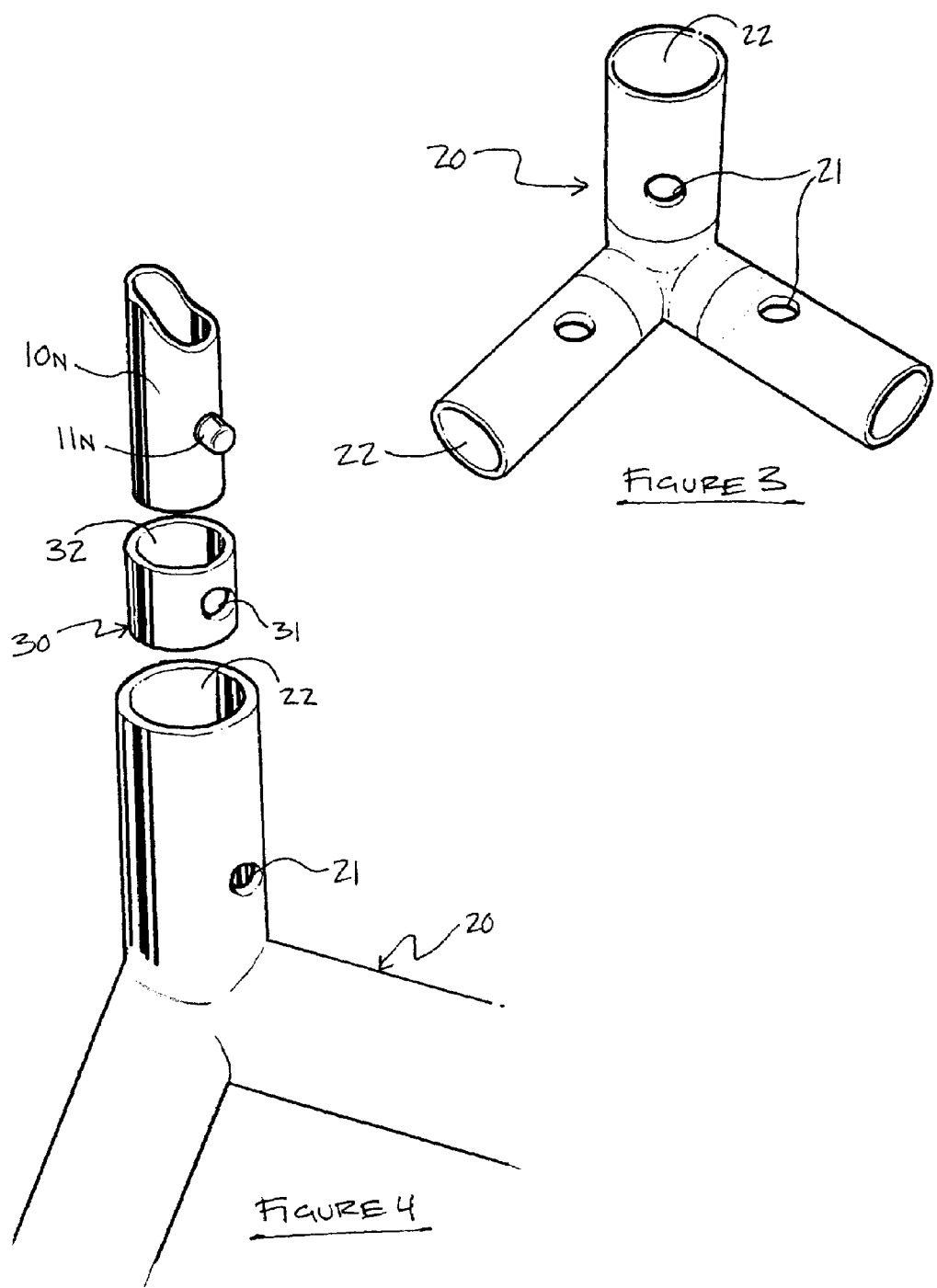

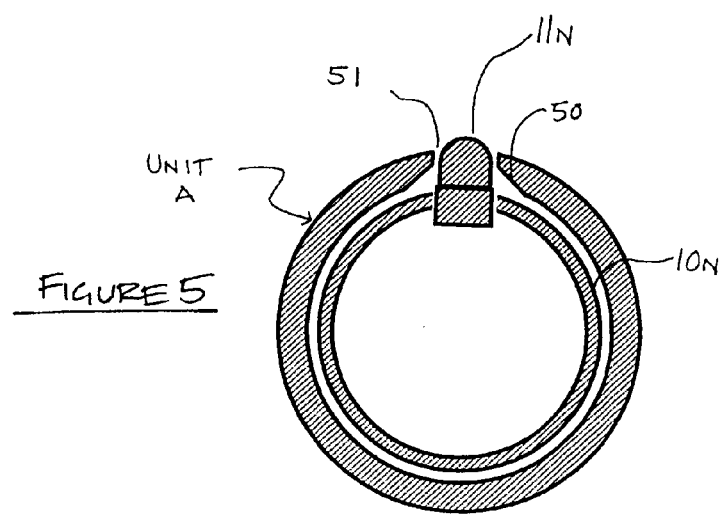
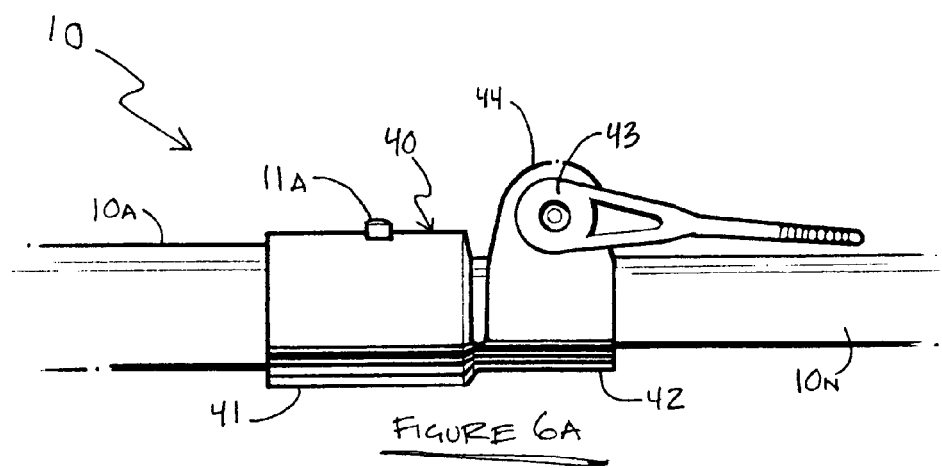
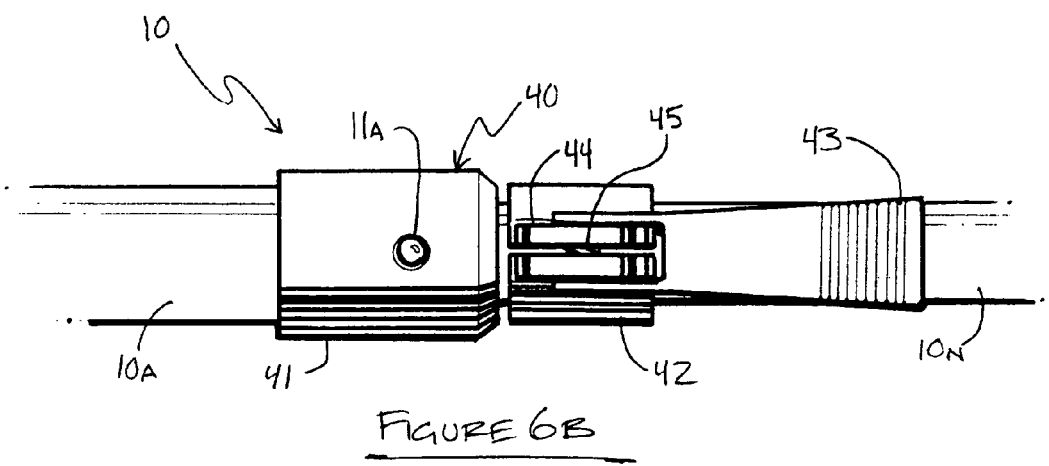

TELESCOPIC MEASUREMENT DEVICE

BACKGROUND OF THE INVENTION

1. Field of the Invention

The present invention generally relates to a telescopically adjustable device for defining or measuring a dimensional space and more specifically a telescopic measurement device that is lightweight and can emulate the dimensions of objects for purposes of testing dimensions in a given space.

2. Description of the Prior Art

When moving furniture or other objects, either for moving, rearranging, or refurnishing, it is important to know the feasibility of getting a piece of furniture safely from one location to another. If a piece of furniture is slightly too big for a hallway, doorway, stairway, elevator, or the like, the piece of furniture may never reach the intended destination, and may, in the process, incur significant damage. In the event that this situation occurs with a new piece of furniture, the damage realized during the unsuccessful move may result in the inability to return the damaged item, or at least incur additional costs. Further, the time and effort that would go into a moving attempt of this type may be substantial.

The moving of a piece of furniture to a space is not the only process involving strict sizing limitations. The process of getting the piece of furniture to the intended location can be difficult, particularly for oversized items. Some pieces may not fit into the back of a van or truck as initially expected by the mover, and therefore may be transported inappropriately, incurring damage to the piece, the vehicle, and/or creating a traffic safety hazard. In the event that the mover makes the safer, more expensive, and more time consuming effort to rent a truck for the moving occasion, knowing the volume of the piece of furniture in advance of renting the truck may save time and money for the mover, as rental trucks are often priced based on the truck size required. A mover would therefore want to rent the smallest truck available to accommodate the item. However, if the mover did not measure, or did not measure correctly, they could again end up with a vehicle that is too small for the item, and have to exchange and upgrade the rental.

Reasons other than physically maneuvering an item into a vehicle or a space may make the move of an item unsuccessful. For example, many furniture warehouses and other furniture stores have relatively high ceilings, thereby dwarfing the furniture, and visually scaling it to seem smaller than it would in a room with an average ceiling height. A purchaser of an item in such a high-ceilinged warehouse may be surprised by the actual appearance of the object in the context of their home or office (as compared with their imagined outcome), and may wish to return the item, again adding greater potential for damage to the item, and wasting time and money in the process.

The primary preparation technique employed by movers in the past and present, is to simply measure the item along all three axes, with a measuring tape or the like, then measure the interior dimensions of the areas en route from the item's origin to its intended location to estimate whether safe and successful navigation of the item is possible. The difficulty with this technique is that it does not fully visualize the item in three dimensions, and the measurements of the areas may be skewed or otherwise impractical for proper dimensional envisionment and planning of item movement. For example, if a large item is to be moved into a room through a doorway on the side of a narrow hallway, the object must be turned in order to enter the room. Although the object may fit in the hallway, and may fit in the doorway, the configuration of the doorway in relation to the hallway may prevent the object from successfully being moved into the room.

To date, no such advancements have been made, particularly from the standpoint of moving an object. U.S. Pat. No. 6,447,080 B1 discloses a set of furniture with a flexible footprint to accommodate a variety of floor plans based on the area of the room's floor. Each component of the furniture set is itself non-adjustable; however, they are generally small enough to provide little difficulty in transporting and maneuvering into position. The two components of the furniture are adjustably connected so that an adjustable length of one unit is underneath and supports the second unit as a foot at one end. This arrangement, although technically adjustable, requires significant effort to make an adjustment including the steps of unscrewing the attachment screws from a bottom surface of the top unit, moving the bottom unit into the new desired position, and then reattaching the units with the screws.

U.S. Pat. No. 6,324,750 B1 teaches an architectural system for adjustably recreating a vehicle interior and a method of constructing a vehicle architecture. The system consists of a prismatic frame, where 5 of the 6 sides are telescopically expanded and the sixth side is located on the downward facing side to be resting on the floor and is comprised of floor plates having support areas for the vertically telescoping sides, thereby dictating the amount that the edges of the top facing side can be expanded. The vertically telescopic edges are held in a predetermined fixed position as defined by aligning apertures of the telescoping portions and threading a pin through the apertures. As a result of this system, all of the telescopic edges, vertical and/or horizontal are adjustable to a very limited number of dimensional possibilities, and are telescopically formed primarily for the purpose of compact storage, at the cost of quick assembly.

U.S. Pat. No. 5,915,810 teaches a telescoping measuring stick with air damped closure and frictional locking. The measuring stick is combined with liquid levels to arrange the telescoping measuring stick to provide accurate vertical or horizontal measurement. Cameron teaches a method for adjustably locking the measure into place at any position through which the telescoping member passes, and a readable measurement located on the telescoping portion. This measurement device is not capable of measuring in more than one direction at a time, and further, the leveling system provided can assure a perpendicular relationship between only two of the three planes (e.g., measuring a vertical distance, the measurement is level from right to left, but there is no indication that the level is not leaning forward or backward.

Therefore, a device providing the capability of defining or measuring a three-dimensional volume of an arbitrary size, that measures and extends in three-perpendicular directions simultaneously, and is easily transported in collapsed or disassembled form has not been available in the prior art.

SUMMARY OF THE INVENTION

It is therefore an object of the present invention to provide a telescopically adjustable three-dimensional structure capable of defining or measuring an arbitrary three-dimensional volume.

It is a further object of the present invention to provide a method for assembling and adjusting the size of a telescopically adjustable three-dimensional structure in order to define or measure an arbitrary three-dimensional volume.

In order to accomplish these and other objects of the invention, an apparatus for defining or measuring an arbitrary three-dimensional volume is provided, comprising a plurality of telescopic units assembled from a first telescopic rod which is substantially hollow and having an exterior surface dimension and an interior surface dimension, a second telescopic rod which is substantially hollow and having an exterior surface dimension smaller than the interior surface dimension of the first telescopic rod and an interior surface dimension, a locking mechanism detachably connecting the first telescopic rod with the second telescopic rod, wherein the first and second telescopic rods each include an attachment feature along the length of each rod's exterior surface located substantially toward an end of the length of each rod; and a plurality of connection units having at least three hollow cylindrical portions having an interior dimension greater than the exterior dimension of the first telescopic rod, wherein the connection units connect a plurality of telescopic units at pre-specified angles.

The telescopic units may further provide measurement markings and numbers on at least the exterior of said second telescopic rod, and a window through the second exterior dimension through to the second interior dimension of the locking mechanism through which a measurement of the total telescopic length of the telescopic unit can be viewed. The measurement markings on the telescopic unit may be raised or depressed in relation to the exterior dimension surface of the telescopic rods. The raised or depressed measurement markings may provide tactile user feedback at specific measurement intervals when telescopically adjusting the second telescopic rod in relation to the first telescopic rod through those measurement intervals. The measurement markings may further provide audible user feedback at specific measurement intervals when telescopically adjusting the second telescopic rod in relation to the first telescopic rod through those measurement intervals.

A method for simulating a three-dimensional object is also provided, comprising the steps of assembling a plurality of telescopic units with a plurality of connection units to create a form extending in three planar directions, wherein each telescopic unit comprises a first telescopic rod which is substantially hollow having an exterior surface perimeter and an interior surface perimeter, a second telescopic rod which is substantially hollow and having an exterior surface perimeter and an interior surface perimeter, a locking mechanism detachably connecting the first telescopic rod with the second telescopic rod, opening the locking mechanism(s), as needed, thereby allowing telescopic movement between the first and second telescopic rods, telescopically adjusting the position of the second telescopic rod in relation to the first telescopic rod to match each of the telescopic units to a desired length to simulate a volume, closing the locking mechanism to prevent telescopic movement of the second telescopic rod in relation to the first telescopic rod, and transporting the plurality of telescopic units and a plurality of connection units to an alternate location through a path.

Further, a method for simulating a three-dimensional object is provided comprising the steps of opening a locking mechanism on a telescopic unit, wherein each telescopic unit comprises a first telescopic rod which is substantially hollow having an exterior surface perimeter and an interior surface perimeter, a second telescopic rod which is substantially hollow having an exterior surface perimeter and an interior surface perimeter, a locking mechanism detachably connecting the first telescopic rod with the second telescopic rod, telescopically adjusting the length of the telescopic unit by adjusting the position of the second telescopic rod in relation to the first telescopic rod to create a desired length for the telescopic unit, closing the locking mechanism to prevent telescopic movement of the second telescopic rod in relation to the first telescopic rod, repeating the above steps on a plurality of telescopic units, and assembling the telescopic units with a plurality of connection units to create a form extending in three planar directions and simulating a desired volume, and transporting the plurality of telescopic units and a plurality of connection units to an alternate location through a path.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is an illustration of an exemplary corner piece in accordance with the invention.

FIG. 4 is an illustration of an expander ring to be used with interior telescoping rods to connect to the end piece.

FIG. 5 is a cross-section of a beveled aperture in relation to the spring lock mechanism.

FIG. 6a is an illustration of a locking mechanism from a side view in an unlocked position allowing the interior rod to telescopically adjust position in reference to an exterior rod.

FIG. 6b is an illustration of a locking mechanism from a top view in an unlocked position allowing the interior rod to telescopically adjust position in reference to an exterior rod.

DETAILED DESCRIPTION OF A PREFERRED EMBODIMENT OF THE INVENTION

Figure 1:
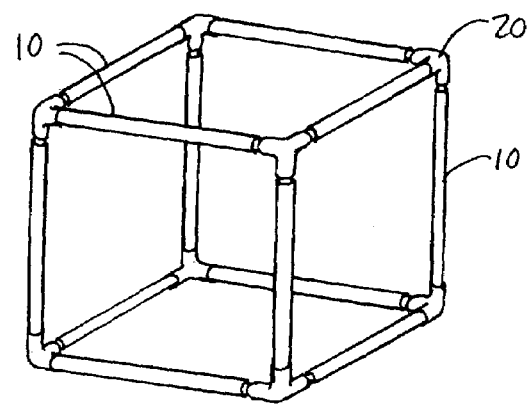
FIG. 1 is an illustration of the invention in an assembled and fully collapsed configuration.

Referring now to the drawings, and more particularly to FIG. 1, there is shown an apparatus in accordance with the invention that is in the assembled and most collapsed position. The apparatus is an assembly of corner connection units 20 and telescoping side units 10. The telescopic units 10 in collapsed position may be any length, and are not required to be of equal lengths, however it is preferred that telescopic units extending in like directions be of equal lengths. In FIG. 1, all side sections are illustrated as being of the same length, and the connector units 20, extend outward from the corner area the same distance in three directions. The combined, assembled dimensions of the cube shown could be 1'×1'×1' to simulate a smaller volume, such as a computer monitor, a microwave, or a minifridge, or 10'×10'×10' to simulate larger volumes, a gazebo, a sculpture, machinery, etc. The following discussion of the various embodiments of the invention are applicable despite the size of the telescopic units in collapsed form.

Figure 2:
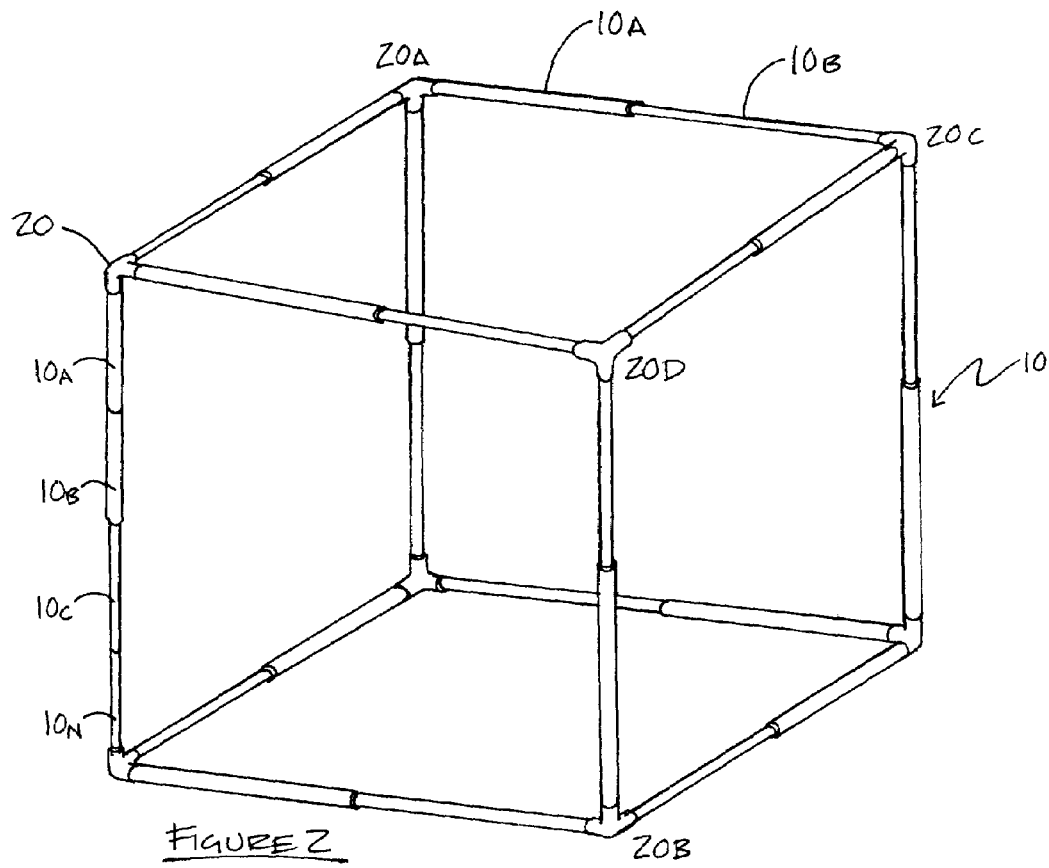
FIG. 2 is an illustration of the invention in an assembled and fully expanded configuration.

FIG. 2 is an illustration of the structure of FIG. 1 in fully expanded form. Telescopic units 10 expand in length as an inner telescopic rod 10B is retrieved from inside of an outer telescopic rod 10A. Through this method, the maximum, fully expanded dimensions can be nearly doubled from the dimensions of the minimum, fully collapsed dimensions. Multiple telescopic sections can provided larger multiples, as desired, and as will be discussed below. The interior telescopic rod 10b may have one or more interior rods, 19C and 10N, that telescope out from inside of a relatively exterior telescopic rod 10B. In this scenario, the fully expanded structure may expand to approximately triple or quadruple, the original size, or greater. Due to overlapping regions of respective exterior telescopic rods and interior telescopic rods, and the non-telescopically expandable corner connection unit lengths, the maximum scalable dimensions (M) are always approximately less than the original collapsed dimensions (C) multiplied by the number of telescopic rods present in said telescopic units 10 (N). Thus, M < CN.

Referring now to FIG. 3, a corner connection unit 20 is shown having three perpendicular cylindrical passages 22, with an aperture 21 extending from the exterior surface to each of the three cylindrical passages 22. It is preferable that all of the cylindrical passages are of the same dimensions, however the invention is not limited to such a configuration. As a connection unit 20 must attach to either end of a telescopic unit 10, as shown in FIG. 2, the two attachment areas of the telescopic unit 10 with the connection units 20 will be of different dimensions. Specifically, the connection end shared with the inner most telescopic rod 10N has smaller dimensions than the exterior most telescopic rod 10A. In one embodiment of the invention, the corner connection units 20 may have cylindrical passages 22 having a variety of dimensional combinations, for example 20A (fitting three exterior telescopic rods), 20B (fitting two exterior telescopic rods and one interior telescopic rod), 20C (fitting one exterior telescopic rod and two interior telescopic rod), and 20D (fitting three interior telescopic rods). This configuration may take longer to assemble, and have limitations in the number of concentric interior telescopic rods that can be used. However, this embodiment would limit part counts and be very practical in a specific set, having a predetermined set of dimensions that it must scale to meet. Further, the time for assembly of the telescopic structure could be minimized by having a coding/matching system to coordinate specific corner connector dimensions with the dimensions of the various telescopic units (e.g., color code, letters, shapes, or other symbol more easily differentiated than similar cylindrical passages having slightly different dimensions.

In a preferred embodiment however, as shown in FIG. 4, allowing for high dimensional customization, all of the cylindrical passages 22 of the connection unit 20 share the dimensional requirements for securing an exterior telescopic rod inside. The innermost interior telescopic rod 10N can be fitted inside of a resizing unit 30 through passage 32 and having spring lock 11n surface through aperture 31. The resizing unit alters the exterior dimensions of the interior telescopic rod 10N to match that of an exterior telescopic rod. The assembly of the interior telescopic rod 10N and the resizing unit 30 are inserted through passage 22 of corner connection unit 20 with the spring lock 11n resurfacing through aperture 21, and thereby locking the units 10N, 30, and 20 together. For disassembly, the spring lock 11N is manually depressed, and the interior telescopic rod 10N and resizing unit 30 assembly is removed from corner connection unit 20 through passage 22, and consequently, the spring lock can be further depressed and released from aperture 31 of resizing unit 30. To provide a smoother release and lock function, the aperture of "Unit A" in FIG. 5 (representing the connection unit 20, the resizing unit 30, or the locking mechanism 40) has an entry/exit circumference on the interior of the passage with a beveled edge, and the spring lock 11N has a rounded or beveled portion on the surface joining the top and side regions of the spring lock body 11N. The rounded top edge coupled with the bevel requires only a minimal depression for the spring lock to release. The spring lock can vary in the length of protrusion from the exterior surface of the interior rod 10N such that it can ultimately reach through the exterior surface of the connection unit 20.

Referring now to FIGS. 6A and 6B, a locking mechanism 40 is shown which is located along the length of the telescopic unit 10, telescopically connecting an exterior telescopic rod 10A to an interior telescopic rod 10N. The locking mechanism shown is in an open position, having the rotating lever 43 pointing in the direction of the interior telescopic rod. In the open position, closure tabs 44 are pushed apart by the threaded axle 45 of the lever 43. As a result of the increased separation of the closure tabs 44, the interior diameter of the smaller end or gripping section 42 of the locking mechanism is enlarged, thereby releasing the frictional tension holding the interior telescopic rod 10N in a fixed position relative to the locking mechanism 40 and the exterior telescopic rod 10a. In absence of the friction, the interior telescopic rod 10N is free to move telescopically in relation to the exterior telescopic rod 10a, and in effect, the telescopic unit 10 can be lengthened or shortened. The spring lock 11,A as discussed above fixedly attaches the exterior rod to the locking mechanism at side 41 in a non-telescoping manner using the aperture system. It is preferable that the distance from the entry point of the locking mechanism 41 to the aperture is the same distance as the distance from the entry passage 22 of the corner connection unit 20 to the aperture 21, but is not required.

Figure 7:
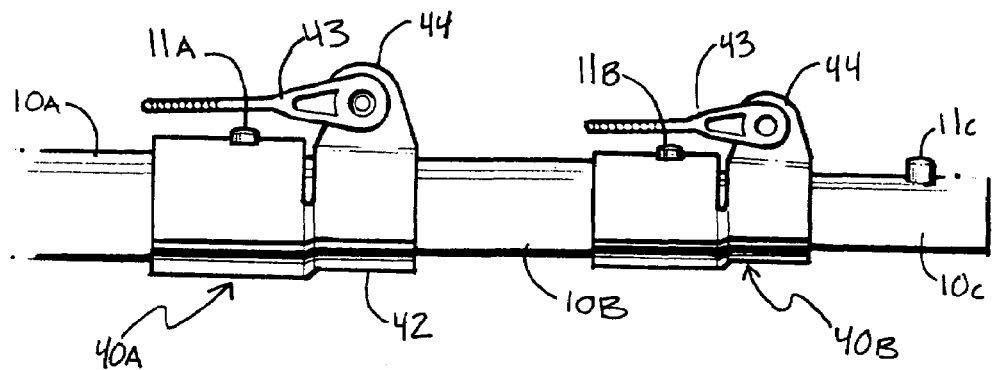
FIG. 7 is an illustration of two locking mechanisms in locked position, restricting telescopic movement of the interior rod in relation to the exterior rod.
Figure 8:
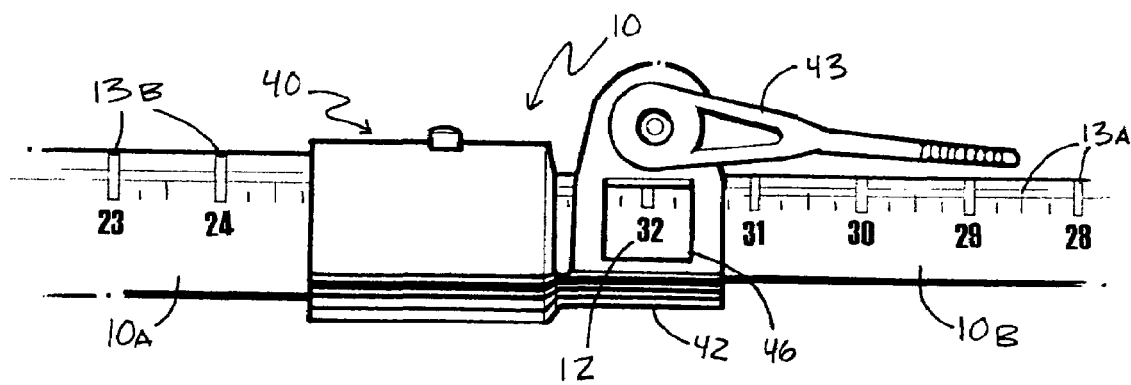
FIG. 8 is an illustration showing an exemplary measuring system in accordance with the invention.

FIG. 7 shows two of the same locking mechanisms as shown in FIGS. 6A and 6B in a closed position when the lever 43 is pointed in the direction of the exterior telescopic rod, the rotation of the lever 43 pulls the closure tabs 44 together, decreasing the interior diameter of gripping section 42 and increasing the friction between the locking mechanisms 40A and 40B and the rods 10B and 10C, respectively. A benefit of the locking mechanism configuration is that when in the locked position, the lever 43 shields the release point for the spring lock mechanism such that when locked accidental detachment is avoided. As shown, the locking mechanisms on the telescopic unit will vary in size according to the dimensions of the respective interior and exterior telescopic rods. The free end of interior telescopic rod 10C may connect to a locking mechanism or a corner connection unit.

In accordance with the invention, the telescopic units 10 may include a measuring system. The measuring system is telescopically adjustable for measurements greater than the dimensions of each telescopic unit in fully collapsed position. In order to achieve this measurement system, numbered markings on the exterior rod are optional, but if present, increase in value from left to right. A window 46 is available in the gripping section 42 of the locking mechanism 40 through which the measurement of the corresponding side of the structure is shown. This measurement includes the length of the connection units and the telescopically revealed portions of the telescopic unit 10 length. This measurement system is preferable when only one interior telescopic rod is present, but can be implemented using multiple interior telescopic rods. The measurement markings may be flush with the surface of the rod (shown as markings 13a), or they may be slightly raised or indented relative to the rod surface (shown as markings 13b) so long as they do not disrupt the telescopic capabilities of the interior 10b and exterior rods 10a. The raised or depressed markings may provide the additional function of providing tactile user feedback as the user expands or contracts the telescopic unit 10. In this embodiment, the gripping area 42 of the locking mechanism could have a semi-flexible feature that fits the groove or raised measurement 13b, such than it provides some tension when the length measurement is not at an exact interval (e.g., one inch, half-inch, quarter-inch, centimeter, foot, etc.) while becoming easily measured to an exact interval.

While the invention has been described in terms of a single preferred embodiment, those skilled in the art will recognize that the invention can be practiced with modification within the spirit and scope of the appended claims.

The invention claimed is:

1. An apparatus for defining or measuring an arbitrary three-dimensional volume, comprising:
    a plurality of telescopic units comprising:
        a first telescopic rod which is substantially hollow and having an exterior surface dimension and an interior surface dimension,
        a second telescopic rod which is substantially hollow and having an exterior surface dimension smaller than said interior surface dimension of said first telescopic rod and an interior surface dimension,
        a locking mechanism which detachably connects said first telescopic rod with said second telescopic rod along a length of said second telescopic rod, allowing said telescopic unit to be adjustably lengthened or shortened to an arbitrary dimension,
    wherein said first and second telescopic rods each include an attachment feature along the length of each rod exterior surface located substantially toward an end of the length of each said rod; and
    a plurality of connection units having
        at least three hollow cylindrical portions having an interior dimension greater than said exterior dimension of said first telescopic rod, wherein said attachment feature at said first end area interacts with an aperture of said connection unit detachably connecting said first telescopic rod to said connection unit,
    wherein said connection units connect a plurality of said telescopic units at prespecified angles.

2. An apparatus as recited in claim 1, wherein the first and second telescopic rods share a common axis.

3. An apparatus as recited in claim 1, wherein said first telescopic rod has an attachment feature located in first and second end areas on the length of the rod,
    and said attachment feature at said second end area interacts with an aperture of said locking mechanisms detachably connecting said first telescopic rod to one of said locking mechanisms.

4. An apparatus as recited in claim 1, wherein said second telescopic rod has an attachment feature located in a first area on the length of said rod,
    and a second end area is removably threaded through one of said locking mechanisms in a telescopically adjustable manner.

5. An apparatus as recited in claim 4, wherein said hollow cylindrical portions of said connection units are of equal circumference.

6. An apparatus as recited in claim 4, wherein a bushing is applied over said first area on the length of said second telescopic rod to provide an exterior diameter of said first area on said second telescopic rod equal to said exterior diameter of said first telescopic rod.

7. An apparatus as recited in claim 4, wherein said attachment feature is a spring locking mechanism.

8. An apparatus as recited in claim 1, wherein at least one aperture exists through a surface of each of said three hollow cylindrical portions.

9. An apparatus as recited in claim 1, wherein one of said connection units connects three telescopic units at perpendicular angles extending in three perpendicular directions.

10. An apparatus as recited in claim 1, wherein said locking mechanism is
    detachably connected to said attachment feature of said first telescopic rod, and
    detachably connected to a plurality of points along the length of said second telescopic rod.

11. An apparatus as recited in claim 10, wherein said locking mechanism has:
    a first interior dimension, wherein
        said first interior dimension of said locking mechanism is greater than said exterior dimension of said first telescopic rod,
        at least one hole extends from a surface having said first interior dimension to a surface having a first exterior dimension,
    wherein said first telescopic rod and attachment feature can be inserted into said interior dimension of said locking mechanism whereby said attachment feature extends from said first telescopic rod through said hole and past said first exterior dimension of said locking mechanism;
    a second interior dimension, wherein
        said second interior dimension of said locking mechanism is greater than said exterior dimension of said second telescopic rod,
        said interior dimension of said locking mechanism having a non-continuous dimension and connecting to closure tabs where said interior dimension ends; and
    wherein said second telescopic rod has portions extending along an axis of the second interior dimension of the locking mechanism through the locking mechanism and inside of said first telescoping rod.

12. An apparatus as recited in claim 11, wherein two of said closure tabs extend away from the axis of said interior dimension of said locking mechanism in a parallel configuration, wherein
    each of said closure tabs comprises an aperture,
    a threaded shaft extends through the aperture of said parallel closure tabs, and
    a lever is attached to the ends of said threaded shaft in a "wishbone" configuration,
    wherein a rotation of the threaded shaft and lever unit by approximately 180° can separate or join said closure tabs sufficiently to release or secure said second telescopic rod.

13. An apparatus as recited in claim 1, wherein
    opening said locking mechanism telescopically releases said second telescopic rod for one of attaching, detaching or adjusting said second telescopic rod in relation to said first telescopic rod, and
    closing said locking mechanism prevents telescopic movement of the second telescopic rod in relation to said first telescopic rod.

14. An apparatus as recited in claim 1, wherein "n" number of telescopic rods are substantially hollow and have various, concentrically nesting interior and exterior dimensions and share a common axis with said first and second telescopic rods.

15. An apparatus as recited in claim 1, wherein said telescoping units further include a telescopic measurement system comprising
    measurement markings and numbers on at least the exterior of said second telescopic rod, and
    a window through said second exterior dimension through to said second interior dimension of said locking mechanism through which said measurement markings can be viewed.

16. An apparatus as recited in claim 15, wherein said measurement markings on said telescopic unit are one of raised or depressed in relation to the exterior dimension surface of the telescopic rods.

17. An apparatus as recited in claim 16, wherein said raised or depressed measurement markings provide tactile user feedback at specific measurement intervals when telescopically adjusting the second telescopic rod in relation to the first telescopic rod through those measurement intervals.

18. An apparatus as recited in claim 16, wherein said raised or depressed measurement markings provide audible user feedback at specific measurement intervals when telescopically adjusting the second telescopic rod in relation to the first telescopic rod through those measurement intervals.

19. A method for simulating a three-dimensional object of arbitrary size comprising the steps of:
    assembling a plurality of telescopic units with a plurality of connection units to create a form extending in three planar directions,
    wherein each telescopic unit comprises:
        a first telescopic rod which is substantially hollow and having an exterior surface perimeter and an interior surface perimeter,
        a second telescopic rod which is substantially hollow and having an exterior surface perimeter and an interior surface perimeter,
        a locking mechanism detachably connecting said first telescopic rod with said second telescopic rod along a length of said second telescopic rod, allowing said telescopic unit to be adjustably lengthened or shortened to an arbitrary dimension, and
        an attachment feature at a first end area of said telescopic unit, wherein said attachment feature at said first end area interacts with an aperture of a connection unit, said connection unit having hollow cylindrical portions for connecting said telescopic unit to another telescopic unit, for detachably connecting said first telescopic rod to said connection unit,
    opening said locking mechanisms, as needed, thereby allowing telescopic movement between said first and second telescopic rods,
    telescopically adjusting the position of said second telescopic rod in relation to said first telescopic rod to match each of said telescopic units to a desired, arbitrary length to simulate a volume,
    closing said locking mechanism to prevent telescopic movement of said second telescopic rod in relation to said first telescopic rod, and
    transporting said plurality of telescopic units and a plurality of connection units to an alternate location through a path.

20. A method as recited in claim 19, wherein the apparatus assembled according to the method may be disassembled for transport or storage, and reassembled at said alternate location.

21. A method as recited in claim 20, wherein said path includes such structural spaces as door ways, corridors, stairways, indoor spaces, outdoor spaces, motor vehicles, including airplanes, trains and boats, cargo areas and warehouses.

22. A method for simulating a three-dimensional object of arbitrary dimensions comprising the steps of:
    opening a locking mechanism on a telescopic unit, wherein each telescopic unit comprises:
        a first telescopic rod which is substantially hollow and having an exterior surface perimeter and an interior surface perimeter,
        a second telescopic rod which is substantially hollow and having an exterior surface perimeter and an interior surface perimeter,
        a locking mechanism detachably connecting said first telescopic rod with said second telescopic rod, and
        an attachment feature at a first end area of said telescopic unit, wherein said attachment feature at said first end area interacts with an aperture of a connection unit, said connection unit having hollow cylindrical portions for connecting said telescopic unit to another telescopic unit, for detachably connecting said first telescopic rod to said connection unit,
    telescopically adjusting the length of said telescopic unit by adjusting the position of said second telescopic rod in relation to said first telescopic rod to create a desired, arbitrary length for said telescopic unit,
    closing said locking mechanism to prevent telescopic movement of said second telescopic rod in relation to said first telescopic rod,
    repeating the above steps on a plurality of telescopic units, and
    assembling said telescopic units with a plurality of connection units to create a form extending in three directions and simulating a desired volume, and
    transporting said plurality of telescopic units and a plurality of connection units to an alternate location through a path.

23. A method as recited in claim 22 wherein the apparatus assembled according to the method may be disassembled for transport or storage, and reassembled at said alternate location.

24. A method as recited in claim 23 wherein said path includes such structural spaces as door ways, corridors, stairways, indoor spaces, outdoor spaces, motor vehicles, including airplanes, trains and boats, cargo areas and warehouses.

* * * * *